Jan. 12, 1965

A. M. MOEN 3,165,118

DIVIDER ASSEMBLY FOR MIXING VALVE

Filed July 13, 1962

INVENTOR.
Alfred M. Moen,
BY Parker & Carter
Attorneys.

United States Patent Office 3,165,118
Patented Jan. 12, 1965

3,165,118
DIVIDER ASSEMBLY FOR MIXING VALVE
Alfred M. Moen, 25 Lakeview Drive, Grafton, Ohio
Filed July 13, 1962, Ser. No. 209,615
3 Claims. (Cl. 137—625.4)

This invention relates to a divider assembly for use in a mixing valve or the like.

A primary purpose of the invention is a divider assembly for the use described which effectively blocks the hot and cold water inlets from each other.

Another purpose is a divider assembly of the type described which may be replaced with ease in the field.

Another purpose is a combination mixing valve and divider assembly which is effective to prevent cross flow between the hot and cold water lines.

Another purpose is a divider assembly of the type described which may be used in any type of faucet assembly to prevent cross flow between the hot and cold water inlets.

Other purposes will appear in the ensuing specification, drawings and claims.

Figure 1:
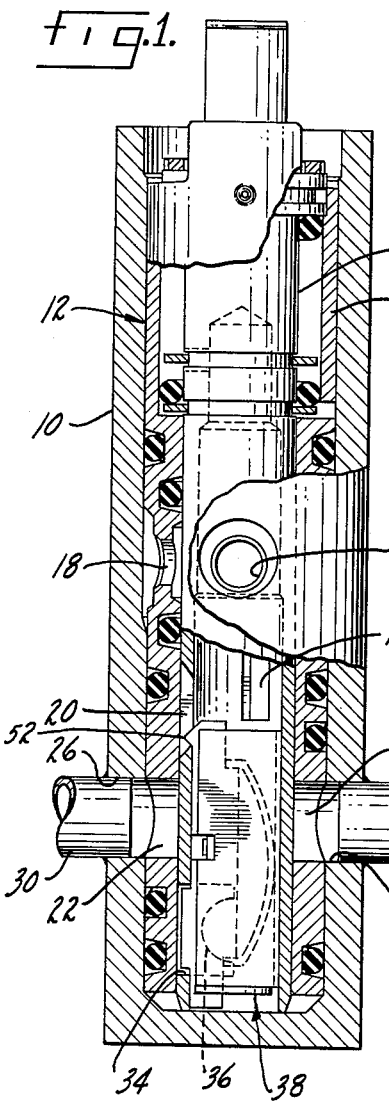
Figure 2:
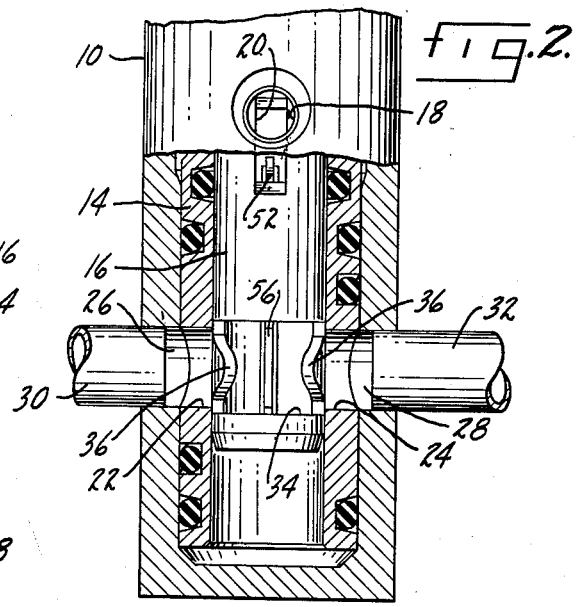
Figure 3:
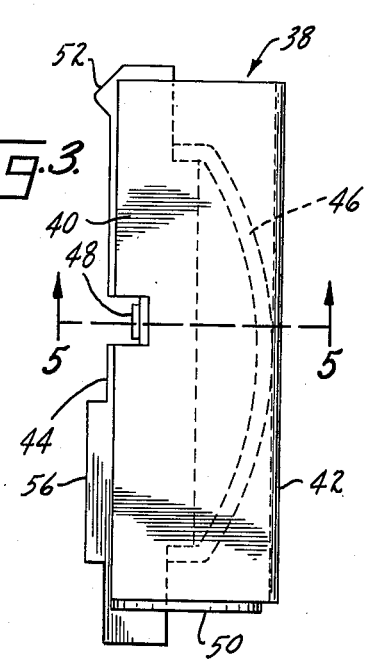
Figure 4:
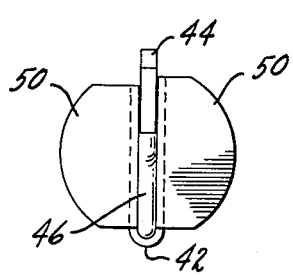
Figure 5:
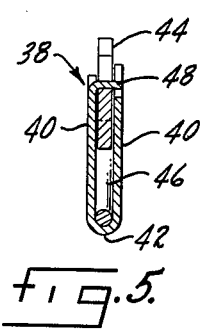

The invention is illustrated diagrammatically in the following drawings wherein:

FIGURE 1 is an axial view, in part section, illustrating a mixing valve using a divider assembly of the type described, FIGURE 2 is a partial axial section illustrating the valve of FIGURE 1 in a second position, FIGURE 3 is an enlarged plan view of the divider assembly, FIGURE 4 is a bottom view of the divider assembly shown in FIGURE 3, and FIGURE 5 is a section along plane 5—5 of FIGURE 3.

In FIGURE 1, a housing 10, which may be a faucet housing, mounts a valve cartridge indicated generally at 12. The particular type of housing and cartridge are not essential to the invention. However, the divider assembly shown and described herein is primarily for use in a housing or cartridge in which the hot and cold water inlet ports are diametrically opposed. The invention should not be so limited, however, as it has practical application in valve cartridges in which the ports are not so positioned, as well as in faucet assemblies which do not utilize mixing valves. The valve cartridge 12 will not be described in detail as it is not essential to the invention. Cartridges of this general type are illustrated in my copending application Serial No. 6,452, filed February 3, 1960, now Patent No. 3,103,231, entitled "Valve Cartridge."

The cartridge 12 may include an outer sleeve 14 and an inner stem or valve member 16. The sleeve 14 may have a plurality of outlet ports 18 which are used to direct water from openings 20 in the hollow stem to a suitable spout or the like. In use, the stem 16 may be reciprocated and rotated within the sleeve 14 to vary the volume and temperature of the water discharged through the spout.

The sleeve 14 may have inlet ports 22 and 24, one for hot water and one for cold water, which may be diametrically opposed. In radial alignment with the ports 22 and 24 in the sleeve are inlet ports 26 and 28 in the housing 10. Suitable conduits 30 and 32 connect into the ports 26 and 28.

The stem 16 may have a circumferentially extending opening 34, adjacent its lower end, which may be placed in communication with one or both of the inlet ports 22 and 24 by rotation and reciprocation of the stem. FIGURE 1 shows the position when the faucet is closed and FIGURE 2 shows the position of the faucet in the open or operating position. The opening 34 may extend approximately half of the circumference of the stem so that, when properly positioned, it can admit a substantial volume of hot and cold water into its hollow interior. The water will be directed upwardly through the hollow stem and then outwardly through the ports 18 to the spout or the like.

Preferably, the opposite axial edges of the opening 34 have circumferentially directed somewhat rounded extensions 36 which are generally similar in size and shape to the size and shape of the inlet ports 22 and 24. It is thus possible to provide more precise regulation of the volumes of hot and cold water. When the sides of the opening 34 are generally straight, it is not as efficient as when they are generally circular in form or take on the configuration of the inlets.

Positioned within the hollow stem 16 is a divider indicated generally at 38. The divider 38 may be long and relatively thin and substantially flat. It fits within the hollow stem in such a way that there can be no crossflow between the hot and cold water inlet ports. At times, even in the best plumbing systems, there may be a sudden decrease or increase in the pressure of either the hot or cold water lines. When that happens and there is no divider, it is possible for the mixing valve to supply only hot water or only cold water. In fact, the line having the greatest pressure may send some of its water down the other line or conduit. To prevent such an occurrence, the divider 38 is positioned within the stem 16 in such a way that it substantially completely blocks the flow of water directly across the stem.

The divider 38 may include a pair of spaced plates 40 which are joined along a longitudinal edge 42. The plates actually may be a single member folded along the edge 42. The plates are spaced apart and a blade 44 is positioned between them. A somewhat arcuate spring 46 may be positioned between the plates 40, behind the blade 44, and biases the blade in an outward direction. A suitable cross tab or the like 48 may be formed generally intermediate the ends of the plates 40 to prevent complete outward movement of the blade 44 and thus disassembly of the divider.

Each of the plates 40 may have an outwardly directed, generally arcuate flange 50 at one end. The opposite end of the divider may have an outwardly extending tab 52 on the blade which is adapted to fit into one or more of the openings 20 in the stem. See FIGURE 1. An axially extending projection 56 generally intermediate the ends of the blade 44, but closer to one end than the other, is adapted to fit into the opening 34 in the sleeve. The projection 56 has a slightly smaller axial length than the opening 34 and cooperates with the tab 52 to yieldingly hold the divider in position. Preferably the divider 38 is positioned along the centerline of the opening 34, although this may vary.

The use, operation and function of the invention are as follows:

In the normal plumbing arrangement, the hot and cold water inlets are diametrically opposed and axially aligned. This is not necessary and the invention should not be limited to this configuration. In any event, the ports, when arranged for use with a mixing valve cartridge, both direct water into the interior of a reciprocal and rotatable stem. Mixing takes place within the hollow interior of the stem. In order to prevent crossflow from one conduit to the other, caused by either a pressure drop in one conduit or a pressure increase in the other, it is desirable to block the hot and cold water inlet ports from each other. Accordingly, a divider has been placed between these two ports in such a way as to substantially completely block crossflow. The divider need only run a limited axial length within the stem as it is only necessary to block direct crossflow. Normally, the mixing of the hot and cold water will take place at the top or slightly above the top of the divider, and within the hollow stem.

The divider may take a variety of shapes, as what is important is to effectively block off the hot and cold water conduits. Preferably, the divider should be yieldingly mounted within the stem so that it may quickly be replaced in the field. As shown herein, the divider is made up of a pair of spaced, generally parallel plates with a spring biased blade positioned between the plates. The blade is used to hold the divider within the hollow stem.

A further feature of the invention is the use of generally arcuate or circular shaped sides on the stem water opening. The shape of the sides of the opening generally match the shape of the inlet ports. In this way a more uniform temperature may be provided while varying the volume. In prior valves in which the sides of the opening were straight, there was a tendency for the valve to howl when in certain mixing positions. The arcuate shaped sides prevent this howling as does the divider itself.

Although the divider has been shown in conjunction with a mixing valve cartridge, the invention should not be so limited as it has practical application in many other types of faucet assemblies.

I claim:

1. In combination, a mixing valve having a sleeve with hot and cold water inlet ports, a hollow valve member in said sleeve, hot and cold water inlet means in said valve member for taking water from the sleeve ports and directing it into its hollow interior, and a divider assembly positioned within said hollow valve member at the hot and cold water inlet means and substantially completely blocking crossflow between the hot and cold water inlets, said divider being relatively thin and flat and being spring mounted within said valve member, said divider including a pair of thin, flat and long plates, joined together along one edge, with a spring biased blade positioned between said plates.

2. The structure of claim 1 further characterized in that said blade has outwardly extending portions which yieldingly hold said divider in said valve member.

3. The structure of claim 2 further characterized in that one of said outwardly extending portions is biased into said inlet means.

References Cited in the file of this patent
UNITED STATES PATENTS

| | | |
|---|---|---|
| 601,718 | Soderlund | Apr. 5, 1898 |
| 2,014,639 | Stumm | Sept. 17, 1935 |
| 2,978,917 | Moen | Apr. 11, 1961 |
| 3,082,773 | Renstrom et al. | Mar. 26, 1963 |